United States Patent
Pages

[19]

[11] Patent Number: 5,433,254

[45] Date of Patent: Jul. 18, 1995

[54] PULLEY-PROTECTING SHOE FOR DRAWING SYSTEMS ASSOCIATED WITH THE HEDDLE FRAMES

[75] Inventor: Jean-Pierre Pages, Faverges, France

[73] Assignee: S.A. Des Establissments Staubli, Faverges, France

[21] Appl. No.: 199,649

[22] Filed: Feb. 22, 1994

[30] Foreign Application Priority Data

Feb. 24, 1993 [FR] France .................. 93 02358

[51] Int. Cl.⁶ .............................. D03C 1/14
[52] U.S. Cl. ........................... 139/82; 254/333
[58] Field of Search ............ 254/333, 389, 411; 139/82, 83, 84, 88

[56] References Cited

U.S. PATENT DOCUMENTS 958,182   5/1910  Schnoor .................. 254/411 X
2,363,353 9/1942  Parker .
3,854,698 12/1974 Ferrentino ................ 254/389 X
5,143,124 9/1992  Froment ................... 139/82 X

FOREIGN PATENT DOCUMENTS 534913 12/1956 Canada ....................... 25/389

Primary Examiner—Andrew M. Falik
Attorney, Agent, or Firm—Dowell and Dowell

[57] ABSTRACT

A shoe for protecting pulleys in a drawing system associated with a heddle frame of a weaving machine. The shoe has an inner portion of concave profile from which a projection extends so as to be receivable within a groove of the pulley. The shoe also includes two outer segments in one of which a groove is provided having a bottom which is oriented tangentially to the groove of the pulley so that the cable guided therein will be directed generally tangentially with respect to the groove of the pulley.

7 Claims, 2 Drawing Sheets

PULLEY-PROTECTING SHOE FOR DRAWING SYSTEMS ASSOCIATED WITH THE HEDDLE FRAMES

FIELD OF THE INVENTION

1. Background of the Invention

The present invention relates to drawing systems interposed between the dobbies and other mechanisms for forming the shed in weaving machines and the heddle frames mounted on the machines for controlling the warp yarns to permit the successive insertion of the weft yarns.

2. History of the Related Art

As shown very schematically in FIG. 1 of the accompanying drawings, such a drawing system ordinarily comprises, with each of the heddle frames 1 of the weaving machine, two cables 2 of which the ends are attached, one to a set of springs 3 intended for the resilient return of the frame 1 shown, the other, to one of the rocking levers 4a of the dobby 4. Between its two ends, each cable 2 is guided firstly by an upper member 5 for defining a vertical strand adapted to be secured to one of the uprights of the frame 1, then by a series of suitably positioned pulleys 6.

It is known that the drawing systems of the above type work in an atmosphere polluted by very voluminous flock constituted by textile waste torn from the weft yarns and from the warp yarns. Such flock is deposited on the parts constituting the drawing system, more particularly on the lower pulleys 6. Due to the oscillating movement of the latter, the flock fills the groove of these pulleys, thus causing derailment of the cables.

In order to avoid such incidents, protecting covers have been proposed, fixed above each group of pulleys to collect the flock and thus avoid it depositing on the pulleys. However, such a remedy has not proved particularly efficient, as the reciprocating rotation of the pulleys 6 causes the introduction of the flock through the perforations made in the cover for the cable 2 to pass.

It is a particular object of the present invention to overcome this drawback by providing a shoe arranged so as to efficiently protect the pulleys of the conventional drawing systems.

SUMMARY OF THE INVENTION

This invention is directed to a shoe for use in preventing flock from entering the groove in a pulley associated with the drawing system for controlling the heddle frame in a weaving loom. Such a pulley is used to guide a cable extending from a rocking lever to a heddle frame.

The shoe includes a body having an inner concave portion which extends from a first end to a second end. A projection extends from the inner portion and has a profile so as to be cooperatively receivable within the groove of the pulley. The body also includes first and second outer segments. A groove is formed in the second outer segment so as to have a bottom surface which is generally tangentially aligned with the second end of the inner portion. Thus, a cable mounted within the groove of the shoe will be aligned tangentially with the groove of the pulley when the shoe is mounted with the projection seated within the groove of the pulley.

In one embodiment, one or a plurality of recesses may be formed in the projection for purposes of receiving any material which may enter into the groove of the pulley.

The shoe also includes an opening in its body for purposes of allowing the shoe to be mounted to a shaft in proximity to a pulley of the drawing system of the weaving machine.

It is the primary object of the present invention to provide a shoe for use in a weaving machine to prevent flock-like material from interfering with grooves in the pulleys which are used to guide cables controlling the movement of heddle frames.

It is yet another object of the present invention to provide a device for preventing the introduction of flock-like material into the groove in a pulley associated with the drawing system of a weaving machine wherein the pulley is used to guide a cable from a rocking lever to a heddle frame. The device includes portions which are engagable within the groove of the pulley when the device is mounted adjacent to the pulley. The device also aligns an associated cable so as to intersect the groove of the pulley generally tangentially with respect thereto so that the cable, itself, also functions to prohibit the introduction of flock-like material into the groove of the pulley.

It is yet a further object of the present invention to provide a shoe device for protecting a pulley associated with the drawing system of a weaving machine which substantially prevents flock-like material from entering the groove of the pulley wherein the shoe includes an arcuate projection which is profiled to cooperatively be received within the groove of the pulley and wherein recesses are provided along the projection in which material that does enter the groove of the pulley may be collected.

BRIEF DESCRIPTION OF THE DRAWINGS

The invention will be more readily understood on reading the following description with reference to the accompanying drawings, in which.

As indicated hereinabove, FIG. 1 schematically shows the structure of a conventional drawing system.

DESCRIPTION OF PREFERRED EMBODIMENT

Figure 1:
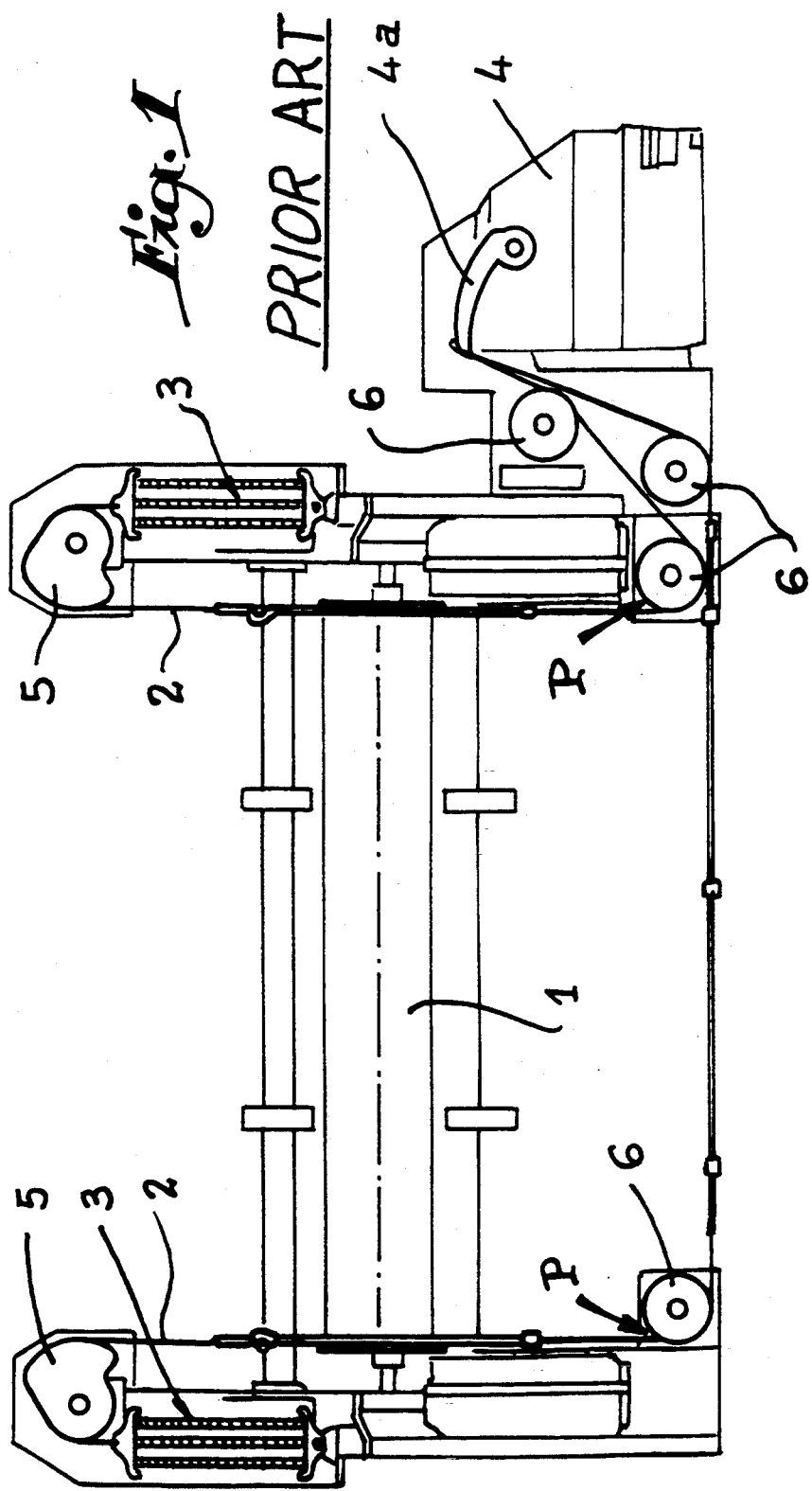
Figure 2:
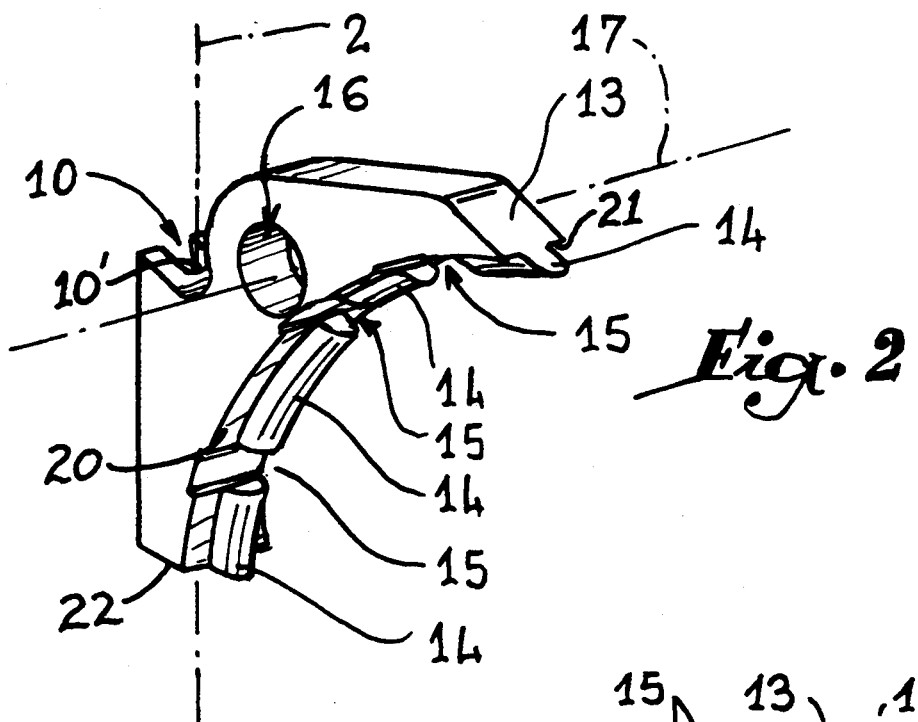
FIG. 2 is a view in perspective showing the arrangement of a protecting shoe according to the invention, especially arranged to equip the pulleys designated by arrows referenced P in FIG. 1.
Figure 3:
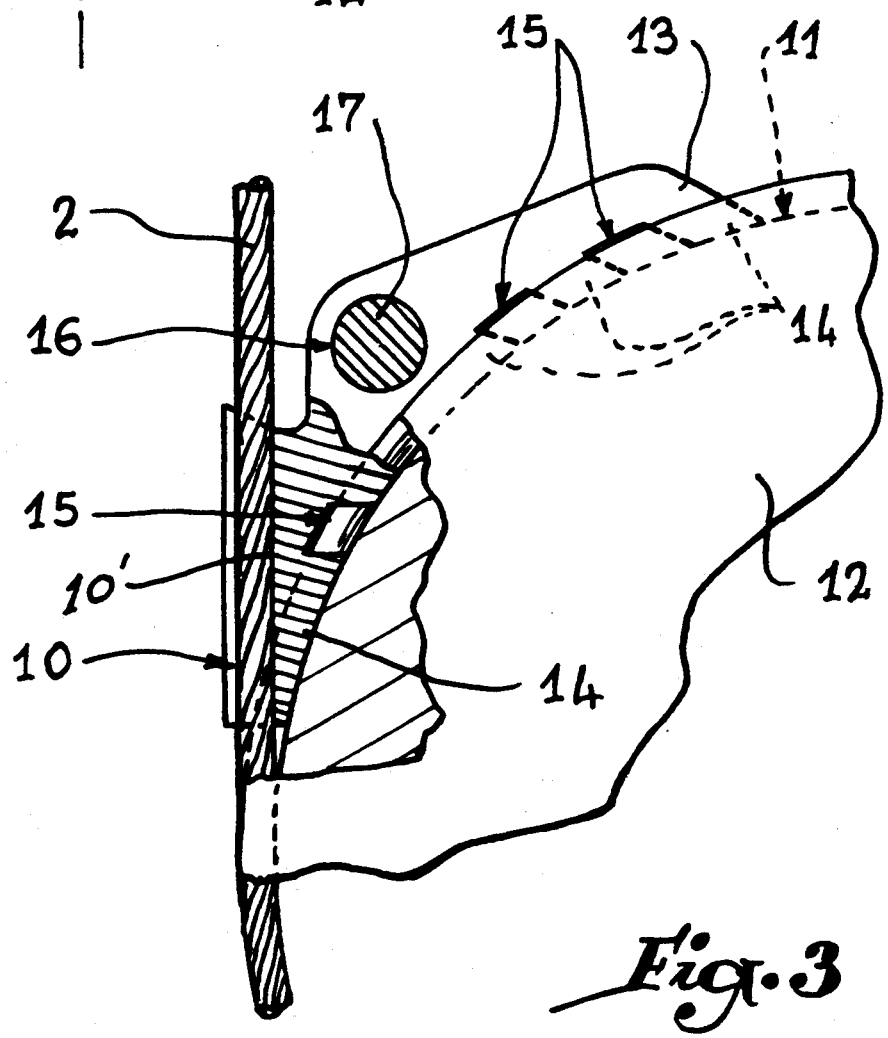
FIG. 3 is a side view, with parts broken away, of the shoe according to FIG. 2.

Referring again to the drawings, the body of the shoe 8 shown in FIGS. 2 and 3 is formed by a monobloc piece which will be assumed to have been obtained by moulding an appropriate synthetic material. This piece has the general shape of a geometric sector and it will be observed:

that the sleeve includes two angularly disposed outer rectilinear segments 13 and 13' and an arcuate inner edge portion 20. The inner edge portion extends from a first end 21 to a second end 22.

that one of the two rectilinear segments 13' has a rectilinear groove 10 formed out therein, of which the profile in cross-section is similar to the groove 11 of the pulley 12 to which the shoe is to be applied;

that the free end of the opposite rectilinear segment is profiled to form an arcuate bow-like configuration, referenced 13;

that the semi-circular inner edge of concave profile includes a projection 14 which 20 has a cross-sectional profile such that it is adapted to engage, with a clearance as small as possible, in the groove 11 of the pulley 12 shown, which projection is interrupted to create empty spaces or recesses 15, three in number in the embodiment disclosed;

and that the upper portion of the shoe of the body includes an opening 16 for the passage of a bar 17 intended to form a shoe support for the assembly which is secured on the bar in any appropriate manner, for example with the aid of radial screws (not shown).

This bar 17 is positioned on the structure of the weaving machine so that, once secured to the bar, the shoe is disposed with respect to the pulley 12 so that the projection 14 is engaged in the groove 11 of the pulley and the bottom of the groove 10 tangentially intersects the groove.

Under these conditions and as illustrated in FIG. 3, the cable 2 is applied against the bottom of the groove 10 before cooperating with the groove 11, thereby opposing penetration of the flock. In the same way, the bow 13, in connection with the projection 14, prevents the flock being introduced in the groove 11. Further, the oblique profile of the bow tends to drive upwardly any flock which is deposited. In addition, the flock which, despite the presence of the shoe, might engage in the groove, would be collected in one of the recesses 15 thus forming decompression spaces.

It will be readily appreciated that the shoe according to the invention may be both of elementary type, being intended to be associated with each of the pulleys of the drawing system, and of collective type, being arranged to ensure protection of all the pulleys mounted on the same support. In addition, the body of this shoe may be profiled to be associated with the different pulleys 6 of the drawing system.

It must, moreover, be understood that the foregoing description has been given only by way of example and that it in no way limits the domain of the invention which would not be exceeded by replacing the details of execution described by any other equivalents.

What is claimed is:

1. A shoe for opposing the introduction of flock into a groove of a pulley used for guiding a cable associated with a drawing system for a heddle frame in a weaving machine, the shoe comprising, a body having a generally concave inner portion and first and second outer segments, said inner portion having first and second ends, a groove formed in said second outer segment, said groove having a bottom surface, an arcuate projection extending outwardly from said concave inner portion, said projection having a configuration so to be receivable within a groove of a pulley, and said bottom surface of said groove in said second outer segment extending generally tangentially with respect to said second end of said concave inner portion of said body, whereby, when the shoe is mounted adjacent to a pulley, said projection will be engaged within the groove of the pulley and a cable disposed within said groove of said second segment of said body will be aligned so as to substantially tangentially intersect with the groove of the pulley adjacent said second end of said inner portion of said body.

2. The shoe of claim 1 including at least one recess formed in said projection.

3. The shoe of claim 2 including a plurality of spaced recesses formed in said projection.

4. The shoe of claim 3 in which said groove in said second segment has a generally rectilinear cross section.

5. The shoe of claim 2 including an opening in said body spaced from said first and second ends of said inner portion.

6. The shoe of claim 3 including an opening in said body spaced from said first and second ends of said inner portion.

7. The shoe of claim 1 including an opening in said body spaced from said first and second ends of said inner portion.

* * * * *